United States Patent [19]

Brech, deceased et al.

[11] 4,406,994

[45] Sep. 27, 1983

[54] WIRE-WOUND RESISTOR

[75] Inventors: Hubertus J. J. Brech, deceased, late of Vessem, Netherlands; by Friedrich J. de Haan, administrator, Dommelen, Netherlands

[73] Assignee: U.S. Philips Corporation, New York, N.Y.

[21] Appl. No.: 340,554

[22] Filed: Jan. 18, 1982

[30] Foreign Application Priority Data

Feb. 19, 1981 [NL] Netherlands ......................... 8100816

[51] Int. Cl.$^3$ ............................................. H01C 3/00
[52] U.S. Cl. ..................................... 338/296; 338/263; 338/267; 338/302; 219/270
[58] Field of Search ............... 338/262, 263, 264, 266, 338/267, 268, 269, 286, 296, 302; 219/270, 552

[56] References Cited

U.S. PATENT DOCUMENTS

| 2,647,192 | 7/1953 | Berkelhamer | 338/266 X |
| 2,727,979 | 12/1955 | Altossar | 338/269 X |
| 2,844,693 | 7/1957 | Rigterink | 338/266 X |
| 3,229,237 | 1/1966 | Berkelhamer | 338/266 |
| 3,248,680 | 4/1966 | Ganci | 338/266 |
| 3,521,213 | 7/1970 | Hardy | 338/296 |
| 3,919,682 | 11/1975 | Costa | 338/262 |

Primary Examiner—Volodymyr Y. Mayewsky
Attorney, Agent, or Firm—Norman N. Spain

[57] ABSTRACT

Wire-wound resistor covered with a layer of enamel on the basis of a zinc borosilicate having a composition:

| $SiO_2$ | 6–18 | CaO | 5–12 |
| $B_2O_3$ | 35–60 | $Al_2O_3$ | 5–15 |
| $Na_2O$ | 2–12 | $ZrO_2$ | 5–10 |
| ZnO | 10–25 | CoO | 0,1–2 | wherein $Al_2O_3 + ZrO_2$ exceeds twice the $Na_2O$-content and some maxima for permissible contents of other oxides, including coloring oxides, are indicated.

This enamel provides a proper solution of the problem of composing an enamel being adequately alkali-proof and being located in the proper range of coefficients of expansion for Ni-Cr and Ni-Cu-wire.

2 Claims, No Drawings

WIRE-WOUND RESISTOR

The invention relates to a wire-wound resistor whose turns are covered with an enamel, and to the relevant enamel.

As a rule, a resistor of such a type is formed from a ceramic tube or rod, for example made of steatite or forsterite, around which the resistive wire made of an alloy on the basis of Cr-Ni or Cu-Ni is wound.

To protect the resistor from atmospheric influences and mechanical damage, the wire turns of the resistor are covered with a vitreous or vitreous crystalline enamel. The originally employed lead oxide-containing enamels which had the advantage of having a low softening point are at present no longer used because during the application process metallic lead is easily separated out.

U.S. Pat. No. 3,919,682 discloses a vitreous-crystalline enamel, which is obtained by controlled crystallisation of a material which is provided on the resistor body in a vitreous state, so that uniformly distributed micro-crystals are produced. Preferably, the enamel has the following composition in percent by weight

| | | | |
|---|---|---|---|
| $SiO_2$ | 10–28 | $Al_2O_3$ | 0.01–14 |
| $B_2O_3$ | 26–50 | $CoO$ | 0–5 |
| $ZnO$ | 28–40 | $Cr_2O_3$ | 0–5 |
| $Na_2O$ | 0,5–10 | $TiO_2$ | 0–10 |
| $CaO$ | 0.01–4 | | |

However, this enamel has some disadvantages. Firstly, the enamel is not alkali-proof. This is important because, after having been assembled, the resistor is immersed in caustic soda in order to dissolve an oxide skin on the copper leads. This is necessary for a proper solderability.

In addition, the range of coefficients of expansion (around $50 \times 10^{-7}$ per °C.) is not adequately adapted to the coefficients of expansion of the customary material of the resistive wire, NiCr or NiCu, namely around $70 \times 10^{-7}$ per °C. This may cause small cracks in the enamel.

The invention provides a range of compositions of the enamel for a wire-wound resistor which is located in the proper range of the coefficients of expansion ($60$–$80 \times 10^{-7}$ per °C.) which is adequately resistant against the action of caustic soda, which is not hygroscopic and can be deposited in a simple way from a suspension.

According to the invention, a wire-wound resistor having a layer of enamel covering the turns, the enamel being on the basis of a zinc silicoborate, is characterized in that the enamel has a composition in percent by weight within the following range of compositions:

| | | | |
|---|---|---|---|
| $SiO_2$ | 6–18 | $CaO$ | 5–12 |
| $B_2O_3$ | 35–60 | $Al_2O_3$ | 5–15 |
| $Na_2O$ | 2–12 | $ZrO_2$ | 5–10 |
| $ZnO$ | 10–25 | $CoO$ | 0.1–2 | and with the additional condition, that $Al_2O_3 + ZrO_2 > 2\,Na_2O$, while

| | | | | |
|---|---|---|---|---|
| $BaO$ | < 10 | | $Fe_2O_3$ | < 2 |
| $MgO$ | < 3 | | $Cr_2O_3$ | < 2 |
| $TiO_2$ | < 5 | | $NiO$ | < 2 |
| $MnO$ | < 4 | | | |

A number of these last-mentioned oxides colour the enamel, either alone or in certain combinations.

These additions are useful for decorative or for coding purposes. This class also comprises CoO; it appears, however, that this oxide also furnishes an important contribution to the adherence to the Ni-Cr or Ni-Cu. Hence CoO must be present in a quantiy of at least 0.1% by weight.

A preferred composition is within the following limits in % by weight:

| | | | |
|---|---|---|---|
| $SiO_2$ | 8–12 | $CaO$ | 5–10 |
| $B_2O_3$ | 35–45 | $Al_2O_3$ | 10–15 |
| $Na_2O$ | 3–6 | $ZrO_2$ | 5–10 |
| $ZnO$ | 15–20 | $CoO$ | 0,1–2 | with the additional condition, that

| | | |
|---|---|---|
| $BaO < 10$ | | $Fe_2O_3 < 2$ |
| $MgO < 3$ | | $Cr_2O_3 < 2$ and |
| $TiO_2 < 5$ | | $NiO < 2$ |
| $MnO < 4$ | | |

The enamels within the range of composition in accordance with the invention remain vitreous during the usual deposition techniques. A finely dispersed crystalline phase can be formed in these enamels, but this takes place during heating for a longer period of time at an elevated temperature (>1000° C.).

There now follow some examples of enamel compositions which are suitable for use in resistors according to the invention.

| | 1 (wt %) | 2 (wt. %) |
|---|---|---|
| $SiO_2$ | 10,2 | 10,0 |
| $B_2O_3$ | 37,7 | 40,0 |
| $Na_2O$ | 4,0 | 5,0 |
| $CaO$ | 7,6 | 7,0 |
| $Al_2O_3$ | 13,8 | 12,5 |
| $CoO$ | 0,7 | 0,8 |
| $MgO$ | 1,5 | 1,5 |
| $ZnO$ | 17,0 | 15,7 |
| $ZrO_2$ | 7,5 | 6,5 |
| $Fe_2O_3$ | — | 1,0 |
| Coefficient of expansion | $70,1 \times 10^{-7}$ | $70,3 \times 10^{-7}$ |

After melting, the said enamels are fritted and thereafter ground to a grain size of less than 60 μm. From this a suspension is prepared having the following composition:

100 g ground enamel 3 g $Fe_2O_3$ 0.5 g $Cr_2O_3$ 15 g of a 25% solution of polystyrene in a mixture of hydrocarbons having a boiling range from 100°–200° C.

50 g of a mixture of hydrocarbons (boiling range 100°–200° C.).

2 g butanol.

The suspension is applied by means of immersion if wire-wound resistors of, for example 100 Ohm, formed from steatite tubes having a diameter of 4 mm with 150 μm thick wound Ni-Cr wire. The enamel coated resistors are baked in a conveyor oven at a temperature between 680°–780° C. for approximately 10 minutes thereafter for approximately 10 minutes between 520° and 590° C., the resistors are then allowed to cool down to 100° C. in the oven for a period of 20 minutes and thereafter outside the oven to ambient temperature.

What is claimed is:

1. A wire-wound resistor whose turns are covered with a layer of enamel on the basis of a zinc silicoborate, characterized in that the enamel has a composition in percent by weight within the following range of compositions:

| $SiO_2$ | 6–18 | CaO | 5–12 |
|---|---|---|---|
| $B_2O_3$ | 35–60 | $Al_2O_3$ | 5–15 |
| $Na_2O$ | 2–12 | $ZrO_2$ | 5–10 |
| ZnO | 10–25 | CoO | 0,1–2 | with the additional condition that $Al_2O_3 + ZrO_2 > 2\,Na_2O$, while,

| BaO | < 10 | $Fe_2O_3$ | < 2 |
|---|---|---|---|
| MgO | < 3 | $Cr_2O_3$ | < 2 |
| $TiO_2$ | < 5 | NiO | < 2 |
| MnO | < 4 | | |

2. A wire-wound resistor as claimed in claim 1, characterized in that the enamel has a composition in percent by weight within the following limits:

| $SiO_2$ | 8–12 | CaO | 5–10 |
|---|---|---|---|
| $B_2O_3$ | 35–45 | $Al_2O_3$ | 10–15 |
| $Na_2O$ | 3–6 | $ZrO_2$ | 5–10 |
| ZnO | 15–20 | CoO | 0,1–2 | with the additional condition, that

| BaO | < 10 | $Fe_2O_3$ | < 2 |
|---|---|---|---|
| MgO | < 3 | $Cr_2O_3$ | < 2 |
| $TiO_2$ | < 5 | NiO | < 2 |
| MnO | < 4 | | |

* * * * *